US007232849B2

(12) United States Patent
Bohling et al.

(10) Patent No.: US 7,232,849 B2
(45) Date of Patent: Jun. 19, 2007

(54) LOW VOID SPACE RESINS AND METHOD OF PREPARATION

(75) Inventors: James Charles Bohling, Lansdale, PA (US); Marlin Kenneth Kenzey, Philadelphia, PA (US); John Joseph Maikner, Zionsville, PA (US); James Franklin Tate, Jr., New Castle, DE (US)

(73) Assignee: Rohm and Haas Company, Philadelphia, PA (US)

( * ) Notice: Subject to any disclaimer, the term of this patent is extended or adjusted under 35 U.S.C. 154(b) by 527 days.

(21) Appl. No.: 10/636,148

(22) Filed: Aug. 7, 2003

(65) Prior Publication Data

US 2004/0034176 A1 Feb. 19, 2004

Related U.S. Application Data

(60) Provisional application No. 60/404,045, filed on Aug. 16, 2002.

(51) Int. Cl.
*C08F 2/18* (2006.01)

(52) U.S. Cl. .................................... 521/146; 521/150

(58) Field of Classification Search ................ 521/146, 521/150
See application file for complete search history.

(56) References Cited

U.S. PATENT DOCUMENTS 3,562,203 A 2/1971 Grunin et al.
4,187,382 A 2/1980 Cowherd, III et al.
4,486,313 A 12/1984 Meitzner et al.
6,214,618 B1 4/2001 Hillegas et al.
6,387,974 B1 5/2002 Deissler et al.
6,410,643 B1 6/2002 Swanson

FOREIGN PATENT DOCUMENTS

GB 2210886 A 6/1989

OTHER PUBLICATIONS

Rana et al., Influence of Resin Cross-linking on Solid-Phase Chemistry, *J. Comb. Chem.*, pp. 3, 9-15 (2001).
Vaino et al., Solid-Phase Organic Synthesis: A Critical Understanding of the Resin, *J. Comb. Chem.*, pp. 2, 579,596, (2000).
Borhan et al., Suspension Copolymerization as a Route to Trityl-Functionalized Polystyrene Plymers, *J. Org. Chem.*, pp. 60,7375-7378, (1995).
Groth et al., Diffusion of Reagents In Macrobeads, *J. Comb. Chem.*, pp. 3, 461-468, (2001).

*Primary Examiner*—Irina S. Zemel
(74) *Attorney, Agent, or Firm*—Kenneth Crimaldi

(57) ABSTRACT

A crosslinked polymeric bead comprising a polymer having from 0.5 mole percent to 2 mole percent crosslinker. The bead has a diameter no greater than 200 μm, no void spaces having a diameter greater than 5 μm, and less than 5 weight percent of organic extractables.

9 Claims, No Drawings

LOW VOID SPACE RESINS AND METHOD OF PREPARATION

CROSS REFERENCE TO RELATED PATENT APPLICATIONS

This is a non-provisional application of prior pending U.S. provisional application Ser. No. 60/404,045 filed Aug. 16,2002.

This invention relates to lightly crosslinked polymeric resins with void spaces of five microns or less. The present invention also relates to methods to prepare such resins.

Lightly crosslinked resins have found significant utility as solid supports for solid phase organic synthesis processes, such as for the production of polypeptides from amino acids. Such resins typically are less than three percent crosslinked. Unfortunately, one result of low crosslinking is that during the preparation of such resins significant amounts of residual monomers remain in the resin bead as it is formed. After washing the resin with swelling solvent to remove such residual monomers, void spaces are created. The void spaces can result in reduced mechanical stability, reduced chemical resistance, and reduced hydrolytic stability. For example, in S. Rana et al., "Influence of Resin Cross-Linking on Solid-Phase Chemistry," *J. Comb. Chem.*, 2001, 3, 9-15, yields of suspension polymerization of styrene and divinyl benzene do not exceed 80%.

The problem addressed by this invention is the need for a crosslinked polymeric bead having no large void spaces.

STATEMENT OF INVENTION

The present invention provides a crosslinked polymeric bead comprising a polymer having from 0.5 mole percent to 2 mole percent crosslinker; wherein said bead has a diameter no greater than 200 μm, no void spaces having a diameter greater than 5 μm, and less than 5 weight percent of organic extractables.

The present invention further provides a method for producing a lightly crosslinked polymeric bead having no void spaces having a diameter greater than 5 μm; said method comprising steps of: (a) preparing a suspension polymerization mixture in a vessel; said mixture comprising: (i) a monomer mixture comprising at least one vinyl monomer and at least one crosslinker; and (ii) from 0.25 mole percent to 1.5 mole percent of at least one free radical initiator; (b) removing oxygen from said vessel by introducing an inert gas for a time sufficient to produce an atmosphere in the vessel containing no more than 5 percent oxygen; (c) allowing the monomer mixture to polymerize; and (d) washing the bead with an aprotic organic solvent.

The present invention further provides a lightly crosslinked bead having no void spaces having a diameter greater than 5 μm and produced by the method of this invention.

DETAILED DESCRIPTION

Percentages are weight percentages, unless specified otherwise. As used herein the term "(meth)acrylic" refers to acrylic or methacrylic. The term "vinyl monomer" refers to a monomer suitable for addition polymerization and containing a single polymerizable carbon-carbon double bond. The term "styrene polymer" indicates a copolymer polymerized from a vinyl monomer or mixture of vinyl monomers containing at least 50 weight percent, based on the total monomer weight, of styrene monomer, along with at least one crosslinker. Preferably a styrene polymer is made from a mixture of monomers that is at least 75% styrene, more preferably at least 90% styrene, and most preferably from a mixture of monomers that consists essentially of styrene and at least one vinylaromatic crosslinker. The lightly crosslinked polymeric bead of this invention contains monomer residues from at least one monomer having one copolymerizable carbon-carbon double bond and at least one crosslinker. The monomer residues derived from the crosslinker are from 0.5 mole percent to 2 mole percent based on the total of all monomer reisdues.

The term "organic extractables" refers to low-molecular weight organic substances that are removed from the polymeric bead by washing in an organic solvent which causes the bead to swell. Examples of organic extractables include, for example, unreacted monomer or crosslinker, or low molecular weight oligomers. Preferably, the amount of organic extractables is measured by suspending the beads in tetrahydrofuran or dichloromethane for two hours, rinsing in a column with five volumes of solvent/volume of beads, drying and determining the weight loss of the beads.

Preferably, organic extractables are removed from the beads of the present invention by treatment with a non-protic organic solvent, preferably one that is not an aliphatic hydrocarbon, for example, halogenated hydrocarbons, cyclic ethers, ketones and aromatic hydrocarbons. Particularly preferred solvents are dichloromethane, dichloroethane, chloroform, chlorobenzene, o-dichlorobenzene, tetrahydrofuran, dioxane, acetonitrile, acetone, xylene and toluene. Preferably, the beads of the present invention contain less than 4 weight percent of organic extractables, more preferably less than 3 weight percent, more preferably less than 2 weight percent, more preferably less than 1 weight percent, and most preferably the beads are substantially free of organic extractables. In one embodiment of the invention, the beads contain less than 3 weight percent of unreacted monomer, more preferably less than 2 weight percent, more preferably less than 1 weight percent, and most preferably the beads are substantially free of unreacted monomer. Typically, the beads contain low levels of extractables and unreacted monomer even prior to washing with an aprotic organic solvent. When the polymer is a styrene polymer crosslinked with divinylbenzene ("DVB"), unreacted monomer may comprise unpolymerized ethylvinylbenzene ("EVB"), a common impurity in commercial divinylbenzene, and possibly also unreacted styrene. Commercial divinylbenzene typically has a purity from 55% to 80%, with the remainder largely consisting of ethylvinylbenzene. Preferably, divinylbenzene with a purity of at least 60% is used, more preferably at least 70%, more preferably at least 75%, and most preferably at least 80%.

A polymeric bead of the present invention preferably is a spherical copolymer bead having a particle diameter no greater than 200 microns (μm), preferably no greater than 170 μm, more preferably no greater than 150 μm, more preferably no greater than 125 μm, and most preferably no greater than 100 μm. Preferably, the bead has no void spaces having a diameter greater than 3 μm, more preferably no void spaces having a diameter greater than 2 μm, and most preferably no void spaces having a diameter greater than 1 μm. Typically, void spaces are readily apparent upon surface examination of the bead by a technique such as light microscopy.

The polymeric bead of the present invention preferably is produced by a suspension polymerization. A typical bead preparation, for example, may include preparation of a continuous aqueous phase solution containing typical suspension aids, for example, dispersants, protective colloids and buffers. Preferably, to aid in production of the relatively small beads of the present invention, a surfactant is included in the aqueous solution, preferably a sodium alkyl sulfate surfactant, and vigorous agitation is maintained during the polymerization process. The aqueous solution is combined with a monomer mixture containing at least one vinyl monomer, at least one crosslinker and at least one free-radical initiator. Preferably, the total initiator level is from 0.25 mole percent to 1.5 mole %, based on the total monomer charge, preferably from 0.4 mole percent to 1 mole percent, more preferably from 0.4 mole percent to 0.8 mole percent, and most preferably from 0.5 mole percent to 0.7 mole percent. The mixture is purged of most of the oxygen by introducing an inert gas until the oxygen level in the atmosphere in the reaction vessel (head space) is less than 5%, preferably less than 3%, more preferably less than 2%, and most preferably less than 1%. Preferably, the inert gas is introduced into the aqueous solution and the monomer mixture, as well as the head space. The mixture of monomers is then polymerized at elevated temperature. Preferably, the polymerization is continued for a time sufficient to reduce the unreacted vinyl monomer content to less than 1% of the starting amount. The resulting bead is then isolated by conventional means, such as dewatering, washing with an aprotic organic solvent, and drying.

In a preferred embodiment of the invention in which one or more of the monomers contains a phenolic polymerization inhibitor, the aqueous phase of the suspension polymerization mixture is maintained at a pH from 9 to 11.5 to extract the phenolic inhibitor from the monomer phase as much as possible. Preferably, the pH of the aqueous phase is from 9.5 to 11.

Crosslinkers are monomers having 2 or more copolymerizable carbon-carbon double bonds per molecule, such as: divinylbenzene, divinyltoluene, divinylxylene, trivinylbenzene, trivinylcyclohexane, divinylnaphthalene, trivinylnaphthalene, diethyleneglycol divinylether, ethyleneglycol dimethacrylate, polyethyleneglycol dimethacrylate triethyleneglycol dimethacrylate, trimethylolpropane trimethacrylate, allyl methacrylate, 1,5-hexadiene, 1,7-octadiene or 1,4-bis(4-vinylphenoxy)butane; it is understood that any of the various positional isomers of each of the aforementioned crosslinkers is suitable. Preferred crosslinkers are divinylbenzene, divinyltoluene, trivinylbenzene or 1,4-bis(4-vinylphenoxy)butane. The most preferred crosslinker is divinylbenzene.

Suitable monounsaturated vinylaromatic monomers that may be used in the preparation of the bead of the present invention include, for example, styrene, α-methylstyrene, $(C_1-C_4)$alkyl-substituted styrenes and vinylnaphthalene; preferably one or more monounsaturated vinylaromatic monomer is selected from the group consisting of styrene and $(C_1-C_4)$alkyl-substituted styrenes. Included among the suitable $(C_1-C_4)$alkyl-substituted styrenes are, for example, ethylvinylbenzenes, vinyltoluenes, diethylstyrenes, ethylmethylstyrenes, dimethylstyrenes and isomers of vinylbenzyl chloride; it is understood that any of the various positional isomers of each of the aforementioned vinylaromatic monomers is suitable.

Optionally, non-aromatic vinyl monomers, such as aliphatic unsaturated monomers, for example, acrylonitrile, glycidyl methacrylate, (meth)acrylic acids and amides or $C_1-C_6$ alkyl esters of (meth)acrylic acids may also be used in addition to the vinylaromatic monomer. When used, the non-aromatic vinyl monomers typically comprise as polymerized units, from zero to 20%, preferably from zero to 10%, and more preferably from zero to 5% of the copolymer, based on the total monomer weight used to form the copolymer.

Preferred vinyl monomers are the vinylaromatic monomers; more preferably styrene, isomers of vinylbenzyl chloride, and α-methylstyrene. The most preferred vinyl monomer is styrene.

Polymerization initiators useful in the present invention include monomer-soluble initiators such as peroxides, hydroperoxides, peroxyesters and related initiators; for example benzoyl peroxide, tert-butyl hydroperoxide, cumene peroxide, tetralin peroxide, acetyl peroxide, caproyl peroxide, tert-butyl peroctoate (also known as tert-butylperoxy-2-ethylhexanoate), tert-amyl peroctoate, tert-butyl perbenzoate, tert-butyl diperphthalate, dicyclohexyl peroxydicarbonate, di(4-tert-butylcyclohexyl)peroxydicarbonate and methyl ethyl ketone peroxide. Also useful are azo initiators such as azodiisobutyronitrile, azodiisobutyramide, 2,2'-azo-bis(2,4-dimethylvaleronitrile), azo-bis(α-methylbutyronitrile) and dimethyl-, diethyl- or dibutyl azo-bis (methylvalerate). Preferred peroxide initiators are diacyl peroxides, such as benzoyl peroxide, and peroxyesters, such as tert-butyl peroctoate and tert-butyl perbenzoate.

Dispersants and suspending agents useful in the present invention are nonionic surfactants having a hydroxyalkyl-cellulose backbone, a hydrophobic alkyl side chain containing from 1 to 24 carbon atoms, and an average of from 1 to 8, preferably from 1 to 5, ethylene oxide groups substituting each repeating unit of the hydroxyalkyl-cellulose backbone, the alkyl side chains being present at a level of 0.1 to 10 alkyl groups per 100 repeating units in the hydroxyalkyl-cellulose backbone. The alkyl group in the hydroxyalkyl-cellulose may contain from 1 to 24 carbons, and may be linear, branched or cyclic. More preferred is a hydroxyethylcellulose containing from 0.1 to 10 $(C_{16})$alkyl side chains per 100 anhydroglucose units and from about 2.5 to 4 ethylene oxide groups substituting each anhydroglucose unit. Typical use levels of dispersants are from about 0.01 to about 4%, based upon the total aqueous-phase weight.

Optionally, the preparation of the beads may include an enzyme treatment to cleanse the polymer surface of residues of dispersants and suspending agents used during the polymerization. The enzyme treatment typically involves contacting the polymeric phase with the enzymatic material (selected from one or more of cellulose-decomposing enzyme and proteolytic enzyme) during polymerization, following polymerization or after isolation of the polymer. Japanese Patent Applications No. 61-141704 and No. 57-98504 may be consulted for further general and specific details on the use of enzymes during the preparation of polymer resins. Suitable enzymes include, for example, cellulose-decomposing enzymes, such as β-1,4-glucan-4-glucano-hydrase, β-1,4-glucan-4-glucanhydrolase, β-1,4-glucan-4-glucohydrase and? β-1,4-glucan-4-cellobiohydrase, for cellulose-based dispersant systems; and proteolytic enzymes, such as urokinase, elastase and enterokinase, for gelatin-based dispersant systems. Typically, the amount of enzyme used relative to the polymer is from 2 to 35%, preferably from 5 to 25% and more preferably from 10 to 20%, based on total weight of polymer.

In a preferred embodiment, this invention is directed to a lightly crosslinked polymeric bead having no void spaces having a diameter greater than 5 μm; said bead produced by a method comprising steps of: (a) preparing a suspension polymerization mixture in a vessel; said mixture comprising: (i) a monomer mixture comprising at least one vinyl monomer and at least one crosslinker; and (ii) from 0.25 mole percent to 1.5 mole percent of at least one free radical initiator; (b) removing oxygen from the suspension polymerization mixture and the vessel by introducing an inert gas for a time sufficient to produce an atmosphere in the vessel containing no more than 5 percent oxygen; (c) allowing the monomer mixture to polymerize; and (d) washing the bead with an aprotic organic solvent. Preferably, the bead made according to this process has no void spaces with a diameter greater than 4 µm, more preferably no void spaces with a diameter greater than 3 µm, and most preferably no void spaces with a diameter greater than 1 µm. Preferably, the bead has less than 5% of organic extractables, more preferably less than 3%, more preferably less than 2%, and most preferably less than 1%. Preferably, the bead has less than 4% of residual monomer, more preferably less than 3%, more preferably less than 2%, and most preferably less than 1%.

Without wishing to be bound by theory, it is believed that the process of this invention facilitates more complete polymerization than previously known processes, and thus reduces the amount of organic extractable materials present in the bead, and therefore also reduces the formation of void spaces in the beads after washing with aprotic organic solvents.

EXAMPLE

Deionized ("DI") water was charged to a round bottom flask, stirred at 150 rpm and heated to 80° C. under a nitrogen sweep. When the temperature was reached, the flask was charged slowly with 4.40 g of QP-300 (hydroxyethylcellulose dispersant, obtained from Union Carbide Co., Institute, W.Va.). The temperature was maintained for 60 minutes at 80° C., after which the aqueous solution was cooled to 25° C. to 30° C. The following were charged to the flask: a solution of 200 g DI water and 0.95 g of Marasperse N-22 (sodium lignosulfate dispersant, obtained from Borregaard LignoTech, Rothschild, Wis.), 2.4 g 50% NaOH, 2.5 g boric acid, 0.036 g sodium lauryl sulfate and 0.1 g sodium nitrite. The contents of the flask were stirred for 30 minutes.

The monomer mixture was prepared in a separate beaker by charging the following: 6.55 g 80% DVB (divinylbenzene), 440.0 g styrene, 5.8 g Trigonox 21 (t-butyl peroxy-2-ethylhexanoate, obtained from Noury Chemical Corp., Burt, N.Y.). The mixture was transferred to an addition funnel and sparged with nitrogen for 40 minutes.

The agitator speed was adjusted to 275 rpm in the round bottom flask containing the aqueous phase before charging the monomer mixture to the flask. The agitator was stopped and the monomer mixture was charged to the aqueous solution, taking care to position the addition funnel so as not to introduce air to the monomer solution. After charging the monomer mixture, agitation was resumed and continued for 30 minutes at 25° C. The temperature was increased to 84° C. over 1 hour and maintained there for 12 hours.

The batch was cooled to 45° C., and the pH adjusted to 5.0 with HCl (37%). Cellulase 4000 (19.05 g) (cellulase enzyme, obtained from Valley Research, South Bend, Ind.) was charged to the batch, and stirred for 2 hours at 45° C. After the 2 hour hold a second charge of Cellulase 4000 was added and the temperature maintained for 2 hours at 45° C. At the end of the hold period the batch was cooled to room temperature, removed from the flask and washed with DI water.

Typically, the yield of polymeric beads is approximately 90%, with some polymer lost due to agitator fouling or dispersion in the aqueous phase. The level of residual monomer varies with several parameters, including the thoroughness of the inertion with nitrogen, purity of DVB, and initiator level, as illustrated in the Table. Inertion of reactants or reaction vessel was not performed, except as noted.

TABLE

| Initiator[1], weight % | DVB purity, % | Residual Styrene, % | Comments |
|---|---|---|---|
| 1.29 | 80 | 3.6 | monomer, aqueous not inerted |
| 1.29 | 80 | 0.6 | full inertion as described in procedure given above |
| 1.29 | 55 | 8.6 | added to achieve same DVB level |
| 1.29 | 80 | 3.7 | |
| 1.29 | 55 | 2.5 | full inertion |
| 1.29 | 80 | 3.6 | |
| 2.30 | 80 | 8.5 | |

[1]t-butyl peroxy-2-ethylhexanoate.

Typically, the polymer is washed according to the following procedure. A 4.4 cm diameter, 50 cm long column is loaded with 100 mL of the copolymer. The copolymer is washed with 28 bed volumes of aprotic organic solvent at a flow rate of 0.5 bed volumes/hour in a down flow direction. The bed is washed with 4 bed volumes of methanol or water at a flow rate of 0.5 bed volumes/hour in a down flow direction. The bed is dried in a stream of nitrogen and then dried under vacuum at 45° C. for 18 hours.

The invention of claimed is:

1. A crosslinked polymeric bead comprising a polymer having from 0.5 mole percent to 2 mole percent crosslinker; wherein said bead has a diameter no greater than 200 µm, no void spaces having a diameter greater than 5 µm, and less than 5 weight percent of organic extractables.

2. The crosslinked polymeric bead of claim 1 in which the polymer has from 0.5% to 1.6% crosslinker and the bead has a diameter no greater than 170 µm.

3. The crosslinked polymeric bead of claim 2 in which the polymer is a styrene polymer with a divinylbenzene crosslinker.

4. The crosslinked polymeric bead of claim 3 in which the polymer has from 0.7 mole percent to 1.2 mole percent crosslinker and the bead has no void spaces having a diameter greater than 3 µm, and less than 3 weight percent of organic extractables.

5. The crosslinked polymeric bead of claim 4 in which the bead has a diameter no greater than 150 µm.

6. A method for producing a lightly crosslinked polymeric bead having no void spaces having a diameter greater than 5 µm; said method comprising steps of:
   (a) preparing a suspension polymerization mixture in a vessel; said mixture comprising: (i) a monomer mixture comprising at least one vinyl monomer and 0.5 mole percent to 2 mole percent of at least one crosslinker; and (ii) from 0.25 mole percent to 1.5 mole percent of at least one free radical initiator;
   (b) removing oxygen from the suspension polymerization mixture and the vessel by introducing an inert gas for a time sufficient to produce an atmosphere in the vessel containing no more than 5 percent oxygen;
   (c) allowing the monomer mixture to polymerize; and
   (d) washing the bead with an aprotic organic solvent.

7. The method of claim 6 in which the atmosphere in the vessel contains no more than 2 percent oxygen.

8. The method of claim 7 in which said at least one vinyl monomer comprises at least 90 mole percent styrene, said at least one crosslinker comprises divinylbenzene, and the bead has a diameter no greater than 200 µm.

9. A lightly cross linked polymeric bead having no void spaces having a diameter greater than 5 µm; said bead produced by a method comprising steps of:
(a) preparing a suspension polymerization mixture in a vessel; said mixture comprising: (i) a monomer mixture comprising at least one vinyl monomer and 0.5 mole percent to 2 mole percent of at least one crosslinker; and (ii) from 0.25 mole percent to 1.5 mole percent of at least one free radical initiator;
(b) removing oxygen from the suspension polymerization mixture and the vessel by introducing an inert gas for a time sufficient to produce an atmosphere in the vessel containing no more than 5 percent oxygen;
(c) allowing the monomer mixture to polymerize; and
(d) washing the bead with an aprotic organic solvent.

* * * * *